United States Patent
Hunt et al.

(10) Patent No.: US 12,205,246 B2
(45) Date of Patent: Jan. 21, 2025

(54) METHOD AND APPARATUS FOR IMPROVED OBJECT DETECTION

(71) Applicant: Telefonaktiebolaget LM Ericsson (publ), Stockholm (SE)

(72) Inventors: Alexander Hunt, Tygelsjö (SE); Saeed Bastani, Dalby (SE); Héctor Caltenco, Oxie (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 17/781,018

(22) PCT Filed: Dec. 16, 2019

(86) PCT No.: PCT/EP2019/085417
§ 371 (c)(1),
(2) Date: May 30, 2022

(87) PCT Pub. No.: WO2021/121548
PCT Pub. Date: Jun. 24, 2021

(65) Prior Publication Data
US 2022/0414830 A1  Dec. 29, 2022

(51) Int. Cl.
*G06K 9/00* (2022.01)
*G06T 5/00* (2006.01)
(Continued)

(52) U.S. Cl.
CPC ............... *G06T 5/00* (2013.01); *G06V 10/25* (2022.01); *G06V 10/454* (2022.01); *G06V 10/82* (2022.01); *G06V 20/20* (2022.01); *G06V 20/52* (2022.01)

(58) Field of Classification Search
CPC ........... G06T 3/40; G06T 3/4015; G06T 7/44; G06T 2207/00; G06T 2207/20; G06T 2207/20012; G06T 2207/20081; G06T 2207/20104; G06T 2207/20112; G06T 2207/20172; G06T 2207/20182;
(Continued)

(56) References Cited

U.S. PATENT DOCUMENTS 10,304,009 B1   5/2019   Kim et al.
2004/0022440 A1  2/2004   Akahori
(Continued)

FOREIGN PATENT DOCUMENTS

EP   3125527 A1   2/2017
EP   3493106 A1   6/2019
EP   3553749 A1   10/2019

OTHER PUBLICATIONS

PCT International Search Report, mailed May 12, 2021, in connection with International Application No. PCT/EP2019/085417, all pages.
(Continued)

*Primary Examiner* — Duy M Dang
(74) *Attorney, Agent, or Firm* — Leffler Intellectual Property Law, PLLC (57) ABSTRACT

An image filtering arrangement comprising a controller configured to receive an image data file; propose zero or more regions of interest for the image data file; and to select adaptive filtering for at least one of the proposed zero or more regions of interest and apply the selected adaptive filtering to the at least one of the proposed zero or more regions of interest.

20 Claims, 6 Drawing Sheets

(51) Int. Cl.
  *G06V 10/25* (2022.01)
  *G06V 10/44* (2022.01)
  *G06V 10/82* (2022.01)
  G06V 20/20 (2022.01)
  G06V 20/52 (2022.01)

(58) Field of Classification Search
  CPC .. G06T 5/60; G06T 5/00; G06T 5/002; G06T 5/003; G06T 5/004; G06T 5/005; G06T 5/006; G06T 5/20; G06F 17/16; G06K 9/00; G06V 10/454; G06V 10/30; G06V 10/82; G06V 30/164
  USPC .................................................. 382/260–265
  See application file for complete search history.

(56) References Cited

U.S. PATENT DOCUMENTS

| | | |
|---|---|---|
| 2007/0223812 A1 | 9/2007 | Ito |
| 2017/0124415 A1 | 5/2017 | Choi et al. |
| 2017/0169315 A1 | 6/2017 | Vaca Castano et al. |
| 2019/0065901 A1 | 2/2019 | Amato et al. |
| 2019/0266784 A1 | 8/2019 | Singh et al. |
| 2019/0311503 A1* | 10/2019 | Nam .................. A61B 6/032 |

OTHER PUBLICATIONS

PCT Written Opinion, mailed May 12, 2021, in connection with International Application No. PCT/EP2019/085417, all pages.
Choi, J. et al., "High-speed High-performance Visual Tracker via Correlation Filter with Compressed Deep Feature", 2018 18th International Conference on Control, Automation and Systems (ICCAS 2018), Oct. 17-20, 2018, YongPyong Resort, PyeongChang, GanWon, Korea, pp. 158-163.
Fortune, S.J., "GPU-Based Raw Digital Photo Manipulation" Darwin College Research Report, DCRR-011, Jun. 1, 2010, 28 pages.
Dostal, Petr et al., "Locally Adaptive Demosaicing Technique for Security Images Based upon Resion-of-Internest Analysis", Security Technology (ICCST), 2011 IEEE International Carnahan Conference, Oct. 18, 2011, 16 pages.
Agarwal, S. et al., "Recent Advances in Object Detection in the Age of Deep Convolutional Neural Networks", arXiv:1809.03193v2 [cs.CV] Aug. 20, 2019, 104 pages.
Guan, T et al., "Atrous Faster R-CNN for Small Scale Object Detection", 2017 2nd International Conference on Multimedia and Image Processing, 2017, pp. 16-21.
Buckler, Mark et al., "Reconfiguring the Imaging Pipeline for Computer Vision", 2017 IEEE International Conference on Computer Vision, 2017, pp. 975-984.
Chen, Xiang et al., "How is Energy Consumed in Smartphone Display Applications?", ACM HotMobile'13, Feb. 26-27, 2013, Jekyll Island, Georgia, USA, 6 pages.
Likamwa, R. et al., "Energy Characterization and Optimization of Image Sensing Toward Continuous Mobile Vision", MobiSys'13, Jun. 25-28, 2013, Taipei, Taiwan, 13 pages.
Neves, A.J.R. et al., "UAVision: A Modular Time-Constrained Vision Library for Color-Coded Object Detection", CompIMAGE 2014, LNCS 8641, 2014, pp. 350-361.
Ren, S. et al., "Faster R-CNN: Towards Real-Time Object Detection with Region Proposal Networks", Microsoft Research, date unknown, 9 pages.
Cooper, G. "High Accuracy Computer Vision with ISPs and Vision Processors", Snyopsys, https://www.synopsys.com, date unknown, 5 pages.
Unknown, Combining an ISP and Vision Processor to Implement Computer Vision, edge ai + vision Alliance, Jan. 28, 2019, 16 pages.
Schwartz, E. et al., "DeepISP: Toward Learning an End-to-End Image Processing Pipeline", IEEE Transactions on Image Processing, vol. 28, No. 2, Feb. 2019, pp. 912-923.
Quan, Longzhe et al., "Maize seedling detection under different growth stages and complex field environments based on an improved Faster R-CNN", Elsevier, Biosystems Engineering 184, 2019, pp. 1-23.

* cited by examiner

METHOD AND APPARATUS FOR IMPROVED OBJECT DETECTION

TECHNICAL FIELD

The present invention relates to an arrangement, an arrangement comprising computer software modules, an arrangement comprising circuits, a device and a method for providing an improved manner of improved image filtering, and in particular to an arrangement, an arrangement comprising computer software modules, an arrangement comprising circuits, a device and a method for providing an improved manner of providing efficient filtering.

BACKGROUND

As computer and processing power grows, so does the application of computer vision and the complexity of the tasks where computer vision is utilized. To enable such complex tasks, artificial intelligence is being used more and more and machine learning are applied extensively to such complex machine vision tasks including segmentation and object detection.

Image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

Object detection is a computer technology related to computer vision and image processing that deals with detecting instances of semantic objects of certain classes (such as humans, buildings, or cars) in digital images and videos. Well-researched domains of object detection include face or pose detection for detecting humans and automotive related object detection (pedestrian, cars, lanes, signs, etc.). Object detection has applications in many areas of computer vision, including image retrieval, industrial use, robotic vision and video surveillance.

An image is captured in a camera or received in another manner from another image source. The image is firstly received in a raw format basically corresponding to the sensor data received from the camera sensor overlaid with a color filter. One example of such a color filter is the Bayer filter providing a raw file in a Bayer format. For the context of this text a raw image will be considered to be an image sensor file possibly overlaid with a color filter, but no other filtering applied to it. Examples of such raw formats are raw image sensor format and CIS (Camera Image Sensor) format to mention a few. For the purpose of this text, raw image sensor format and CIS format will be referred to as raw format.

As is known, a raw image file is not suitable (at least not optimal) for human viewing and the raw image has to undergo substantial processing or filtering through Image Signal Processing procedural blocks (ISP) before the image looks as it is intended and may be consumed in the intended manner by a human. An ISP can be a standalone and specialized processor, or it can be a series of instructions performed as a procedural routine on an image file by a processor. For the context of this text, there will not be made any difference between different ISPs, but they will all be referred to simply as ISP blocks or ISPs.

It can be noted that applying the Bayer filter to sensor data is in actuality a filtering performed by a ISP that adds color to the sensor data, which is in greyscale initially. However, as most image sensors perform this Bayer formatting on chip and the actual sensor data is not separately available, the raw image file will be considered to possibly include the Bayer formatting.

The ISPs typically perform a series of filters. Some examples of filters are demosaicing, noise reduction, gamma correction, sharpening, lens correction, color correction, white balance adjustment, exposure adjustment, auto focus control, color space conversions, color manipulation calculations, JPEG compression, H.264, H.265, or H.266 video encoding to mention a few examples. The exact filters and their functions vary greatly from camera manufacturer to manufacturer and will thus not be discussed in detail herein.

The purpose of applying the ISPs is to provide an image that can be viewed by a human and the resulting image file is usually provided in a JPEG, TIFF or other known image format. The resulting image is then fed to the machine learning blocks or modules which perform inference, utilizing for example Convoluted Neural Networks providing feature maps, based on regions of interest, which feature maps are subsequently used for object detection and/or segmentation.

Most of the energy (power and time) utilized by computer vision systems is consumed by inference tasks. However, as hardware acceleration and specialized processors become more and more evolved, the energy cost for inference is reduced. The inventors have realized that the energy needed to filter or otherwise process the image files will therefor consume a significant share of the total system energy, and the inventors have realized that there is thus a need for a device and a method for providing a manner of reduced processing of images, while still allowing for a high accuracy of object detection and/or segmentation.

SUMMARY

The inventors have realized that most of the filtering (or processing) performed by the ISPs are aimed at providing images that are usable for human visions. However, the same aspects that are important for human visions, may not be important, required or even beneficial for computer vision. As each filtering step removes or changes the original data, some data may even be lost through the filtering, and the resulting image may thus be less beneficial for use in computer vision.

An object of the present teachings is therefore to overcome or at least reduce or mitigate the problems discussed, by providing a manner of performing computer vision inference on the raw image file with as little filtering as needed. The inventors are proposing an ingenious, simple and elegant manner of adapting the filtering applied to an image data file, or parts of the image data file (i.e. regions) by processing the unfiltered or raw image data file in a region proposal network (RPN) and based on the probability of a proposed region, select which filter(s) to apply to the region(s). In this manner, only the filtering actually needed is provided and the amount of energy spent on processing in average is reduced significantly.

According to one aspect an image filtering arrangement is provided, the image filtering arrangement comprises a controller configured to: receive an image data file; b) propose zero or more regions of interest (ROI) for the image data file; and to c) select adaptive filtering for at least one of the proposed zero or more regions of interest (ROI) and apply the selected adaptive filtering to the at least one of the proposed zero or more regions of interest (ROI).

The solution may be implemented as a software solution, a hardware solution or a mix of software and hardware components.

In one embodiment the image data file is received in a raw format where a color filter has been applied.

In one embodiment the image data file is received in a raw format where no color filter has been applied.

In one embodiment the raw format is a raw image sensor format. In one embodiment the raw format is a camera image sensor (CIS) format.

In one embodiment the controller is further configured to select said adaptive filtering for a region of interest based on a characteristic of the region of interest.

In one embodiment the controller is further configured to select said adaptive filtering for a region of interest based on a characteristic of the region of interest exceeding or falling short of a threshold.

In one embodiment the characteristic of the region of interest is a probability (P) that the region contains an object.

In one embodiment the controller is further configured to select a first set of filters (ISP) for a first region of interest having a first probability and a second set of filters (ISP) for a second region of interest having a second probability, wherein the first probability is higher than the second probability and wherein the first set of filters (ISP) represent a more extensive filtering than the second set of filters (ISP).

In one embodiment the controller is further configured to select adaptive filtering for each of the proposed zero or more regions of interest (ROI) and adapt the selected adaptive filtering to each of the proposed zero or more regions of interest (ROI).

In one embodiment the controller is further configured to select zero filters (ISP) as adaptive filtering for regions of the image data file not proposed as being regions of interest (ROI).

In one embodiment the controller is further configured to select a first set of filters (ISP) for a first region of interest and a second set of filters (ISP) for a second region of interest, wherein the first set of filters (ISP) include at least one filter (ISP) of a first type and/or variation and the second set of filters (ISP) include at least one filter (ISP) of a second type and/or variation.

In one embodiment the controller is further configured to apply at least one common filter (ISP) prior to proposing regions.

In one such embodiment the at least one common filter (ISP) is arranged to handle or implement a Bayer format filter.

In an alternative or additional such embodiment the controller is further configured to apply further processing to the regions of interest (ROI) subsequent to applying the selected filters (ISP). In one such embodiment the further processing is object detection. In one such embodiment the object detection is based on a Deep Neural Network model.

In one embodiment the image filtering arrangement is comprised in a camera or other image sensor device.

In one embodiment the image filtering arrangement is a display possibly to be used with another device or in another device.

In one embodiment the image filtering arrangement is a smartphone or a tablet computer.

In one embodiment the image filtering arrangement is a virtual reality device.

In one embodiment the image filtering arrangement is an AR/MR (optical see-through) device.

In one embodiment the image filtering arrangement is arranged to be used in image retrieval, industrial use, robotic vision and/or video surveillance.

According to one aspect a method for use in an image filtering arrangement is provided, the method comprising a) receiving an image data file; b) proposing zero or more regions of interest (ROI) for the image data file; and c) selecting adaptive filtering for at least one of the proposed zero or more regions of interest (ROI) and apply the selected adaptive filtering to the at least one of the proposed zero or more regions of interest (ROI).

According to one aspect there is provided a computer-readable medium carrying computer instructions that when loaded into and executed by a controller of an image filtering arrangement enables the image filtering arrangement to implement a method according to herein.

According to one aspect there is provided a software component arrangement for filtering image files in an image filtering arrangement, wherein the software component arrangement comprises: a) a software component for receiving an image data file; b) a software component for proposing zero or more regions of interest (ROI) for the image data file; and c) a software component for selecting adaptive filtering for at least one of the proposed zero or more regions of interest (ROI) and apply the selected adaptive filtering to the at least one of the proposed zero or more regions of interest (ROI).

According to one aspect there is provided an arrangement comprising circuitry for filtering images in an image filtering arrangement, wherein the arrangement comprising circuitry comprises: a) a circuitry for receiving an image data file; b) a circuitry for proposing zero or more regions of interest (ROI) for the image data file; and c) a circuitry for selecting adaptive filtering for at least one of the proposed zero or more regions of interest (ROI) and apply the selected adaptive filtering to the at least one of the proposed zero or more regions of interest (ROI).

It should be noted that even though the teachings are disclosed as used for object detection, they may equally be applied to segmentation and there will not be made any difference between object detection and segmentation herein. Further embodiments and advantages of the present invention will be given in the detailed description. It should be noted that the teachings herein find use in object detection, image classification and image filtering arrangements in many areas of computer vision, including image retrieval, industrial use, robotic vision, augmented reality and video surveillance.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1A:
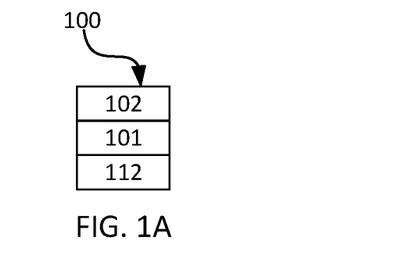
FIG. 1A shows a schematic view of an image filtering arrangement according to an embodiment of the present invention.

FIG. 1A shows a schematic view of an image filtering arrangement 100 according to an embodiment of the present invention. The image filtering arrangement comprises a controller 101, a memory 102, an image data receiving device 112, such as for example a camera or image sensor, an image streaming device (such as a communication interface) or an image data reading device arranged to read image data from the memory 102. The controller 101 is configured to receive at least one image data file, corresponding to at least an image, from the image data receiving device 112, and to perform filtering such as by applying a number of ISPs to the image data file and subsequently to perform object detection (or image classification or segmentation) on the resulting (portion of the) image. The image data receiving device 112 may be comprised in the image filtering arrangement 100 by being housed in a same housing as the image filtering arrangement, or by being connected to it, by a wired connection or wirelessly.

It should be noted that the image filtering arrangement 100 may comprise a single device or may be distributed across several devices and apparatuses.

The controller 101 is also configured to control the overall operation of the image filtering arrangement 100. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field-Programmable Gate Arrays circuits, AISIC, GPU, etc. in addition or as an alternative. For the purpose of this application, all such possibilities and alternatives will be referred to simply as the controller 101.

The memory 102 is configured to store graphics data and computer-readable instructions that when loaded into the controller 101 indicates how the image filtering arrangement 100 is to be controlled. The memory 102 may comprise several memory units or devices, but they will be perceived as being part of the same overall memory 102. There may be one memory unit for a display arrangement storing graphics data, one memory unit for image capturing device storing settings, one memory for the communications interface (see below) for storing settings, and so on. As a skilled person would understand there are many possibilities of how to select where data should be stored and a general memory 102 for the image filtering arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

It should be noted that the teachings herein find use in arrangements for object detection, segmentation and image filtering in many areas of computer vision, including object detection in mixed or augmented reality systems, image retrieval, industrial use, robotic vision and video surveillance where a basic image filtering arrangement 100 such as in FIG. 1A may be utilized. In one embodiment, the image filtering arrangement 100 is a digital camera or other image sensor device (or comprised in such device). In one embodiment, the image filtering arrangement 100 is connected to a digital camera or other image sensor device.

Figure 1B:
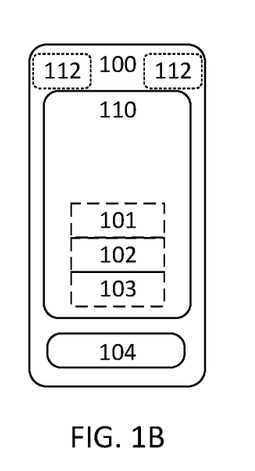
FIG. 1B shows a schematic view of an image filtering arrangement according to an embodiment of the present invention.

FIG. 1B shows a schematic view of an image filtering arrangement being a viewing device 100 according to an embodiment of the present invention. In this embodiment, the viewing device 100 is a smartphone or a tablet computer. In such an embodiment, the viewing device further comprises a display arrangement 110, which may be a touch display, and the image data receiving device 112 may be a series of cameras of the smartphone or tablet computer. In such an embodiment the controller 101 is configured to receive an image from the camera (or other image receiving device) 112, detect objects in the image and display the image on the display arrangement 110 along with virtual content indicating or being associated with the detected object(s). In the example embodiment of FIG. 1B, the camera 112 is arranged on a backside (opposite side of the display 110, as is indicated by the dotted contour of the camera 112) of the image filtering arrangement 100 for enabling real life objects behind the image filtering arrangement 100 to be captured and shown to a user (not shown in FIG. 1B) on the display 110 along with any displayed virtual content. The displayed virtual content may be information and/or graphics indicating and/or giving information on detected objects.

Figure 1C:
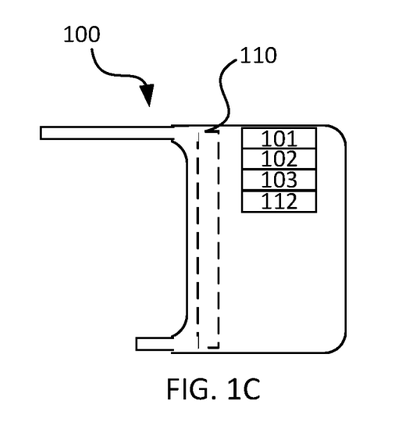
FIG. 1C shows a schematic view of an image filtering arrangement according to an embodiment of the present invention.

FIG. 1C shows a schematic view of an image filtering arrangement being or being part of an optical see-through (OST) viewing device 100 according to an embodiment of the present invention. The viewing device 100 is a see-through device, where a user looks in through one end, and sees the real-life objects in the line of sight at the other end of the viewing device 100. The viewing device 100 is in one embodiment a virtual reality device.

In one embodiment the viewing device 100 is a head-mounted viewing device 100 to be worn by a user (not shown explicitly in FIG. 1C) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

The viewing device comprises a display arrangement 110 for presenting virtual content to a viewer and an image data receiving device 112 for identifying or detecting objects. As disclosed above with reference to FIG. 1A, the image data receiving device 112 may be remote and comprised in the image filtering arrangement through a connection to the image filtering arrangement 100.

In the following, simultaneous reference will be made to the image filtering arrangements 100 of FIGS. 1A, 1B and 1C.

It should also be noted that even if only one image data receiving device 112 is discussed in the above, the image data receiving device is arranged to receive image data relating to more than one image, such as a video sequence or from parallel image sources, for advanced photo manipulation effects.

In one embodiment the image filtering arrangement 100 may further comprise a communication interface 103. The communication interface may be wired and/or wireless. The communication interface may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface. In one embodiment the communication interface comprises an analog interface, a CAN (Controller Area Network) bus interface, an 12C (Inter-Integrated Circuit) interface, or other interface.

In one embodiment the communication interface comprises a radio frequency (RF) communications interface. In one such embodiment the communication interface comprises a Bluetooth™ interface, a WiFi™ interface, a ZigBee™ interface, a REID™ (Radio Frequency IDentifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systeme Mobile) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the image filtering arrangement 100 and an external host device (not shown).

The communications interface 103 may be configured to enable the image filtering arrangement 100 to communicate with other devices, such as other image filtering arrangements 100 and/or smartphones, Internet tablets, computer tablets or other computers, media devices, such as television sets, gaming consoles, video viewer or projectors (not shown), or image capturing devices for receiving the image data streams.

A user interface 104 may be comprised in the image filtering arrangement 100 (only shown in FIG. 1B). Additionally or alternatively, (at least a part of) the user interface 104 may be comprised remotely in the image filtering arrangement 100 through the communication interface 103, the user interface then (at least a part of it) not being a physical means in the image filtering arrangement 100, but implemented by receiving user input through a remote device (not shown) through the communication interface 103. One example of such a remote device is a game controller, a mobile phone handset, a tablet computer or a computer.

Object detection algorithms today uses already processed images for training and inference. This implies that when an image is fed to the neural networks implementing such training and inference, the image needs to go through the full image process of the device i.e all filters in an image signaling processor is run. This will optimize the image for human vision, however, as the inventors have realized, this is not necessarily the same as the image being optimized for computer vision tasks. The inventors are therefore proposing to solve the problem of using too much energy for filtering by applying a Region Proposal Network (RPN) to the raw format image data file and analyzing the information from the RPN to select only filters in the ISP which are most beneficial for object detection, segmentation or other subsequent task, so that the image or part of the image is optimized for the object detection network (or other network) instead of the human vision.

Figure 2:
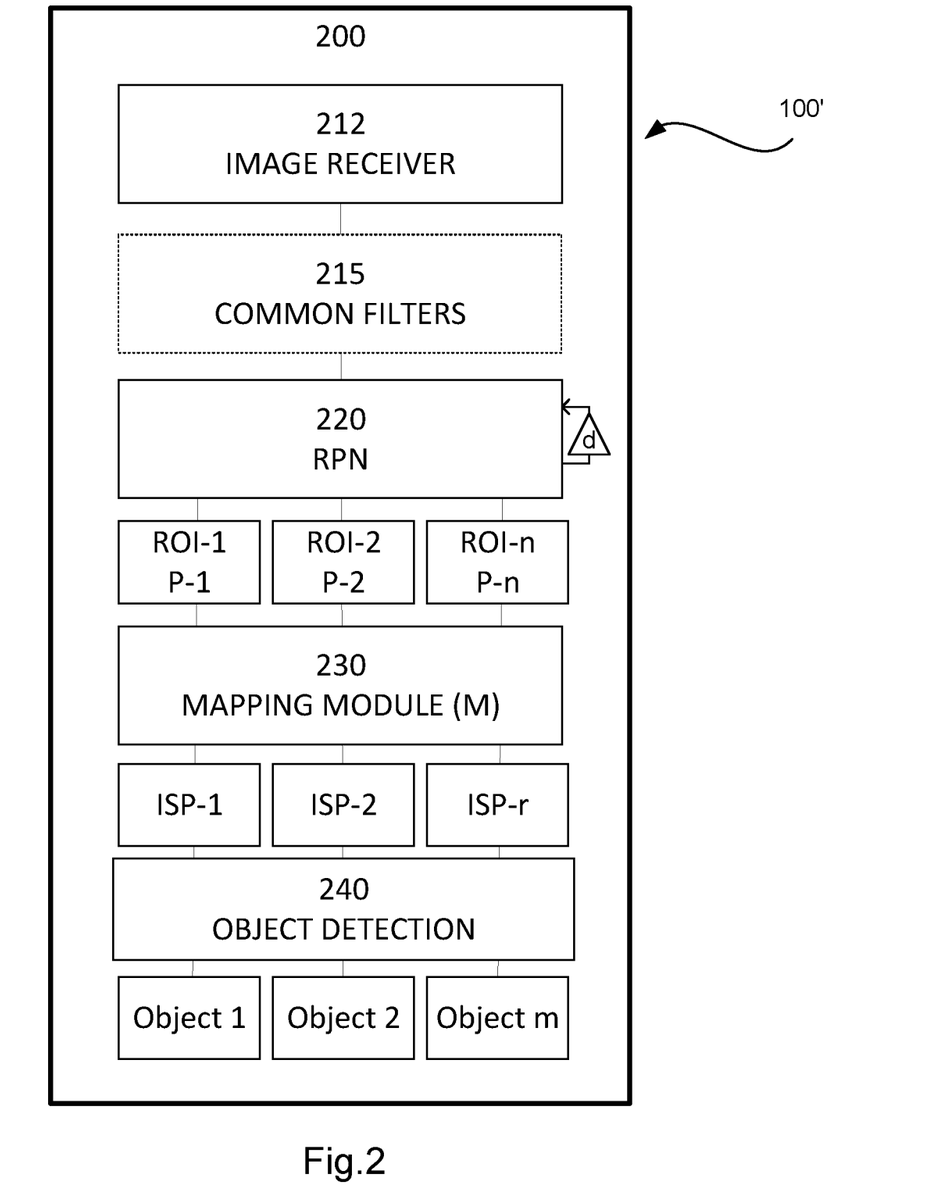
FIG. 2 shows a schematic view of an object detection model including a filter arrangement according to one embodiment of the teachings herein.

FIG. 2 shows a schematic view of an image processing model 200 (such as an object detection model) comprising an image filtering arrangement model 100' (showing the processing modules of the image filtering arrangement 100) according to one embodiment of the teachings herein. The image filtering arrangement model 100' (and possibly the rest of the object detection model 200) is arranged to be executed by a controller 101 of on image filtering arrangement 100 according to herein, a software component arrangement 400 according to herein, an arrangement comprising circuitry 500 according to herein or being utilized by a method according to herein. It should be noted that different parts of the image filtering arrangement model may be executed by different parts of the corresponding executing arrangement.

The image filtering arrangement model 100 comprises an image data receiver 212 that receives an image data file. The image data stream receiver 212 is operatively connected to an image source; in one embodiment the image receiving device 112 of the image filtering arrangement 100 and in one such embodiment, by being comprised in the corresponding image receiving device 112.

The image data file comprises image sensor data representing an image. In one embodiment the sensor data has been applied a color format filter. One example of such a color format filter is the Bayer filter. The image data file is thus received in a raw format.

The image filtering arrangement model 100' further comprises a region proposal network (RPN) 220. The RPN is in one embodiment a neural network that identifies and proposes regions of the image data file, that correspond to regions where an (one or more) object may exist, i.e. regions of interest (ROIs). A region ROI may be associated with a probability P that the region comprises an object. As indicated in FIG. 2, the RPN may propose zero or more ROIs. In the schematic view of FIG. 2 this is indicated by the blocks ROI-1, ROI-2 and ROI-n indicating a series of ROIs numbering 1 to n (possibly 0 if n=0).

The image filtering arrangement model 100' further comprises an image mapping module (M) 230 that receives at least one ROI and based on characteristics of the ROI, such as the associated probability P if such is provided, selects which filters or sets of filters (ISPs) that should be applied to the ROI, providing an adapted filtering of the ROI. In one embodiment, the mapping module is arranged to select individual filters to apply, thereby enabling for highly customized filtering. In one embodiment the mapping module is arranged to select sets of filters to apply, thereby enabling for an easier implementation of the mapping module.

The different filters applied to different ROIs are indicated in FIG. 2, by the blocks ISP-1, ISP-2, and ISP-r being the (sets of) filters applied to ROI-1, ROI-2 and ROI-n respectively. It should be noted that some of the ROIs may be applied the same filter (sets) and the number of filter (sets) may thus differ from the number of ROIs.

As stated above, the filters to be applied may be selected based on a probability associated with a region of interest. The inventors have realized that a region that is associated with a high probability of containing object(s) already exhibits features that are recognizable to the computer vision task, albeit not to a human, and does not need much further filtering. Whereas a region that is associated with a low probability does not yet exhibit such features and possibly need more filtering for such features to appear/be clearly detectable. In one embodiment the mapping module 230 is arranged to select a more extensive filtering (such as a higher number of filters and/or more advanced filters) to an ROI associated with a lower probability P, and to select a more restrictive filtering (such as a lower number of filters and/or less advanced filters) to an ROI associated with a higher probability P. The mapping module 230 is thus arranged, in such an embodiment, to select the amount of filtering for an ROI based on the associated probability P.

In one embodiment, the mapping module 230 is arranged to select a first set of filters if the probability exceeds a first threshold, and to select a second set of filters if the probability falls short of the first threshold, wherein the second set of filters provide a more extensive filtering than the first set of filters.

In one such embodiment, the mapping module 230 is further arranged to select the second set of filters only if the probability also exceeds a second threshold, and to select a third set of filters if the probability falls short of the second threshold, wherein the third set of filters provide a more extensive filtering than the second set of filters.

In such a manner, a more extensive filtering is applied to the ROIs that does not yet comprise clearly detectable features, providing for high accuracy even for ROIs of lower quality.

It should be noted that a filter set may be empty indicating that no further filtering is needed.

As can be seen in FIG. 2, only the regions of interest (ROIs) are selected for adaptive filtering. Areas which the RPN does not indicate as being of interest are not filtered. By simply and elegantly applying the RPN at the start and thus ignoring some regions of an image reduces the energy needed significantly on average, as most images statistically contain large portions that are not of interest for finding objects or segments (or other processing).

A threshold may be related to the probability of finding an object in a region based on the number, clearness and/or accuracy of features of the region. A threshold may also or alternatively be related to the number of potential objects in a region. A threshold may also or alternatively be related to the size of a region.

A threshold may thus be multidimensional in some embodiments.

The thresholds may be provided by the system designer, or, more likely, learnt by the system during training of the image filtering arrangement, whereby thresholds that provide good results for the further processing is selected for further use. The filter mapping may thus be learnt through end-to-end training, especially when utilizing deep learning mechanisms for the further processing.

The mapping module may be set up indicating which filter (set) is to be used for which probability (or other characteristic), or possibly for which threshold(s). The mapping module may indicate different filters for different regions, but may also or alternatively indicate different types or parameters for the same general type of filter for different regions. For example one region may be applied a demoasicing filter having one characteristic(s) and another region may be applied a (second) demoasicing filter having another characteristic(s).

Examples of different filters include but are not limited to demosaicing, noise reduction, gamma correction, sharpening, lens correction, color correction, white balance adjustment, exposure adjustment, auto focus control, color space conversions, color manipulation calculations, JPEG compression, H.264, H.265, or H.266 video encoding to mention a few examples.

Examples of different characteristics include but are not limited to power use, edge enhancement, color enhancement, exposure curve and complexity of the algorithm used to name a few examples.

The mapping module may thus be arranged to select a filter map to a region, which filter map indicates which if all available filters and characteristics or variations of such filters are to be used for the region.

The (sets) of filters to be applied may be provided by the system designer, or, more likely, learnt by the system during training of the image filtering arrangement, whereby filter sets that provide good results for the further processing is selected for further use.

As an image data file—or rather the regions of interest for the image—has been filtered, the regions of interest are forwarded for further processing, such as to an object detection module 240, that performs inference and subsequent object detection on the regions of interest, providing a zero or more objects (possibly 0).

In the schematic view of FIG. 2 this is indicated by the blocks Object-1, Object-2 and Object-m indicating a series of objects numbering 1 to m (possibly 0 if m=0). It should be noted that as each ROI may comprise none, one or several objects, there is no straight correlation between the number of ROIs and the number of objects and n may equal m, n may be smaller than m or n may be larger than m.

It should be noted that the object detection is only an example of further processing and the object detection module 240 may be replaced by a segmentation module 240 or other further processing module 240, providing different results than the objects 1 to m.

As has been discussed in the above, the adaptive filtering may be applied to an image data file comprising unprocessed sensor data or it may be applied to an image data file to which a color filter has been applied. A color filter, such as a Bayer filter, is an example of a common filter 215 that may be applied to all image data files, before applying the RPN. As is indicated in FIG. 2, common filters may be applied either as part of all filter sets or optionally (indicated by a dotted box) as a common filter 215. Returning to the regions or portions that are not proposed by the RPN, they may also be applied the common filters providing a minimal filtering to all portions of the image data file or simply not filtered.

The RPN 220 is in one embodiment arranged to be recurrent in that it implements a temporal dynamic behavior, where at least a part of the result of the analysis performed for one image data file is fed back and provided as input for the analysis to be performed for a future or later image data file. This is indicated by the feedback arrow indicated as having a delay (indicated by a 'd' in a triangle) associated with it in FIG. 2. The delay indicates that the output for one frame (i-1) is used as the input for a subsequent frame (i). It should be noted that the delay need not be for a single next frame, but can alternatively or additionally be for one or several frames and for one or several frames in time. That the RPN 230 is recurrent or exhibiting temporal dynamic behavior, provides a temporal aspect to the region identification and the RPN is thus based on both temporal aspects (as the common feature extractor 230 exhibits temporal dynamic behavior) and spatial aspects.

The further processing, may be an object detection module 240 comprising inference based on a recurrent neural network (RNN), and in one such embodiment a combination of RNN and CNN (Convoluted Neural Network) layers.

As the inventors have ingeniously realized that the RPN, which is normally applied as part of a CNN for inference, may be applied already on the raw file format, the RPN need not be performed again and the inference is simply provided with the regions of interest right from the start.

In one embodiment, the image filtering arrangement 100 is configured to perform the object detection (or segmentation) utilizing an object detection model based on Machine Learning. In one such embodiment, the machine learning is based on a deep learning neural network. The RPN may thus be adopted as an adapted or modified version of a Faster RCNN object detection model.

The inventors have further realized that the idea of adaptive filtering may be expanded to adaptive inference and/or adaptive object detection (or adaptive segmentation), to further save on energy. In such embodiments, the different further processing, exemplified by the object detection 240, may be adapted by providing different inference and/or object detection algorithms or networks for different ROIs based on characteristics of the ROI, such as the associated probability, size and/or shape of the region. For example, as with the filtering, the inventors have realized that an ROI having a high probability (or other characteristic) is most likely already exhibiting identifiable features, whereby the inference may be simplified to a less extensive or advanced inference for such regions. The same may be applied to the object detection where a simple object detection process may be applied to an ROI having a higher probability (or other characteristic).

Figure 3:
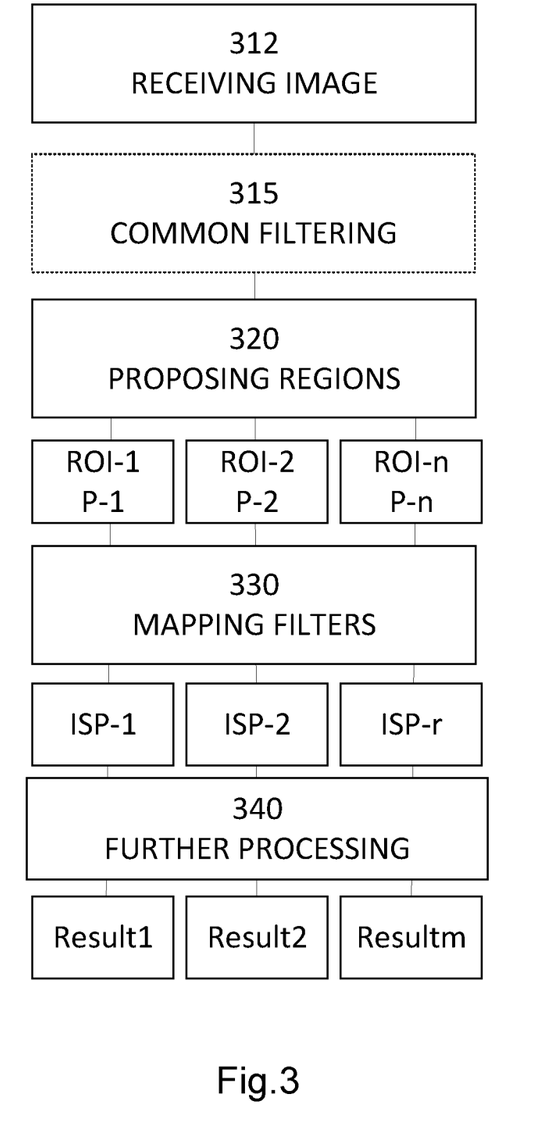
FIG. 3 shows a flowchart of a general method according to an embodiment of the present invention.

FIG. 3 shows a flowchart of a general method according to an embodiment of the teachings herein. The method utilizes an image filtering arrangement 100 as taught herein. The method comprises an image filtering arrangement 100 receiving 312 an image data file that may be in raw format. The image filtering arrangement 100 process the image in a RPN to propose 320 zero or more regions of interest (ROI) for the image data file. The image filtering arrangement 100 selects 330 adaptive filtering for at least one of the proposed zero or more regions of interest (ROI) and applies the selected adaptive filtering to the at least one of the proposed zero or more regions of interest (ROI).

Figure 4:
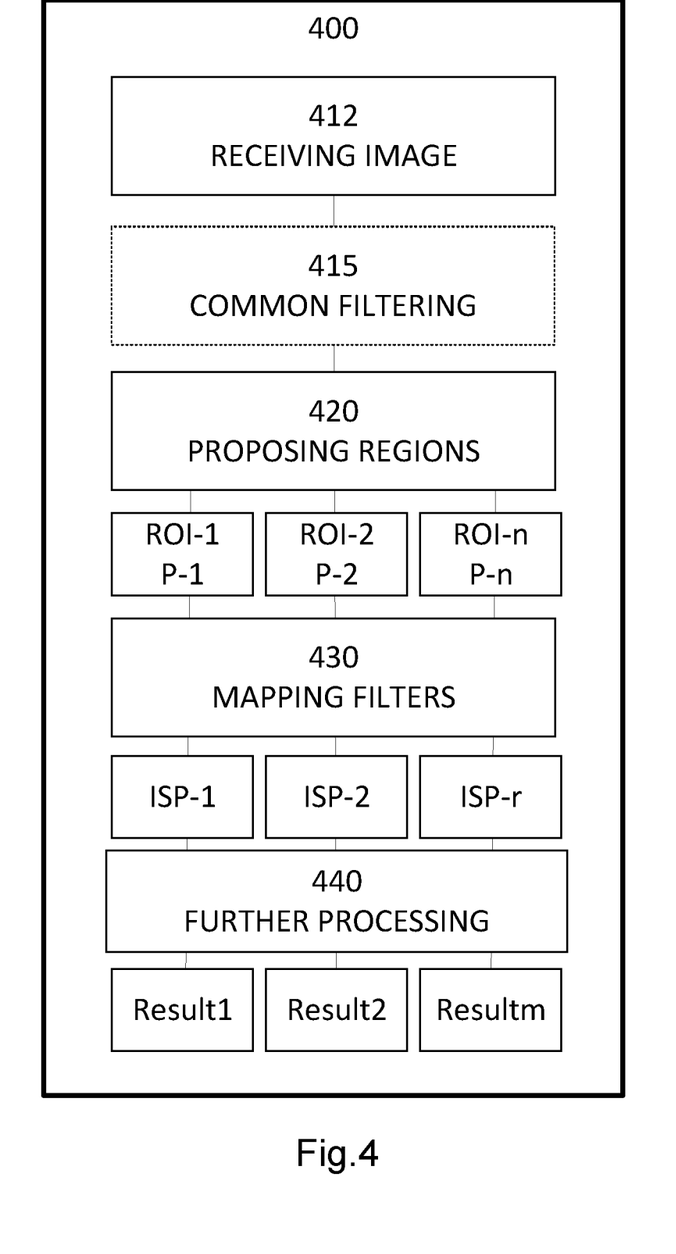
FIG. 4 shows a component view for a software component arrangement according to an embodiment of the teachings herein.

FIG. 4 shows a component view for a software component (or module) arrangement 400 according to an embodiment of the teachings herein. The software component arrangement 400 is adapted to be used in an image filtering arrangement 100 as taught herein for providing image filtering and possibly subsequent object detection or segmentation as taught herein The software component arrangement 400 comprises a software component for receiving 412 an image data file that may be in a raw format.

The software component arrangement 400 also comprises a software component for proposing 420 zero or more regions of interest (ROI) for the image data file and a software component for selecting 430 adaptive filtering for at least one of the proposed zero or more regions of interest and apply the selected adaptive filtering to the at least one of the proposed zero or more regions of interest.

Figure 5:
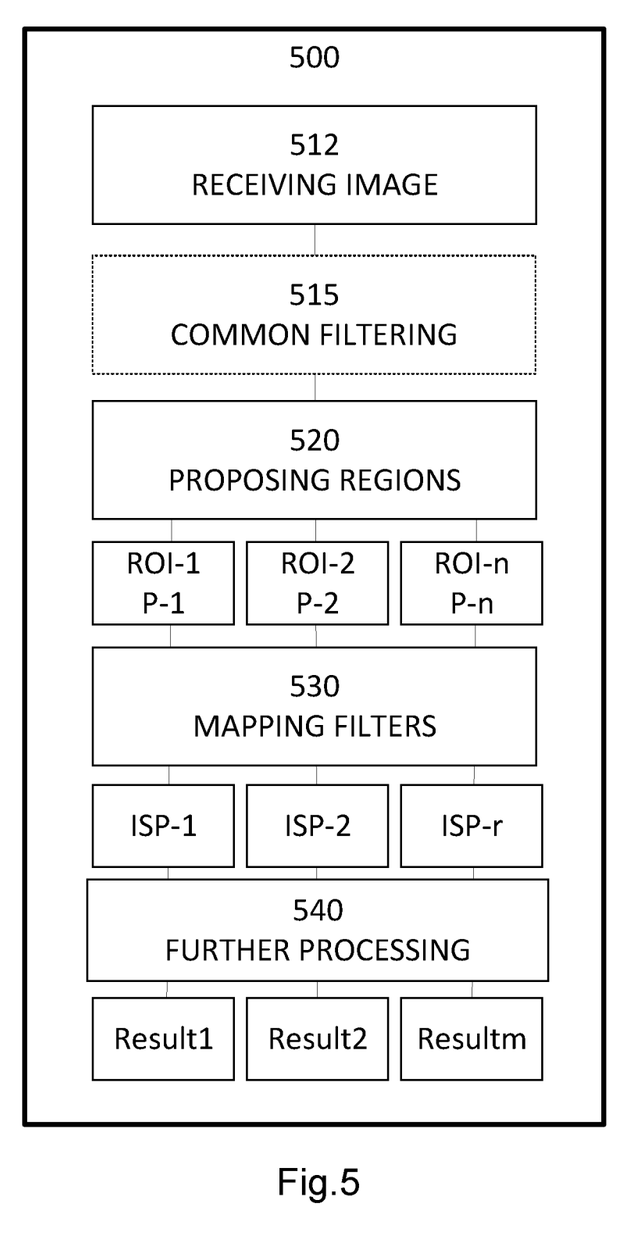
FIG. 5 shows a component view for an arrangement comprising circuits according to an embodiment of the teachings herein.

FIG. 5 shows a component view for an arrangement comprising circuitry for image filtering 500 according to an embodiment of the teachings herein. The arrangement comprising circuitry for image filtering 500 is adapted to be used in an image filtering arrangement 100 as taught herein for providing image filtering and possibly subsequent object detection and/or segmentation.

The arrangement comprising circuitry for image filtering 500 of FIG. 5 comprises a circuitries 512 for receiving an image data file that may be in a raw format.

The arrangement comprising circuitry for image filtering 500 also comprises a circuitry for proposing 520 zero or more regions of interest (ROI) for the image data file and a circuitry for selecting 530 adaptive filtering for at least one of the proposed zero or more regions of interest and apply the selected adaptive filtering to the at least one of the proposed zero or more regions of interest.

Figure 6:
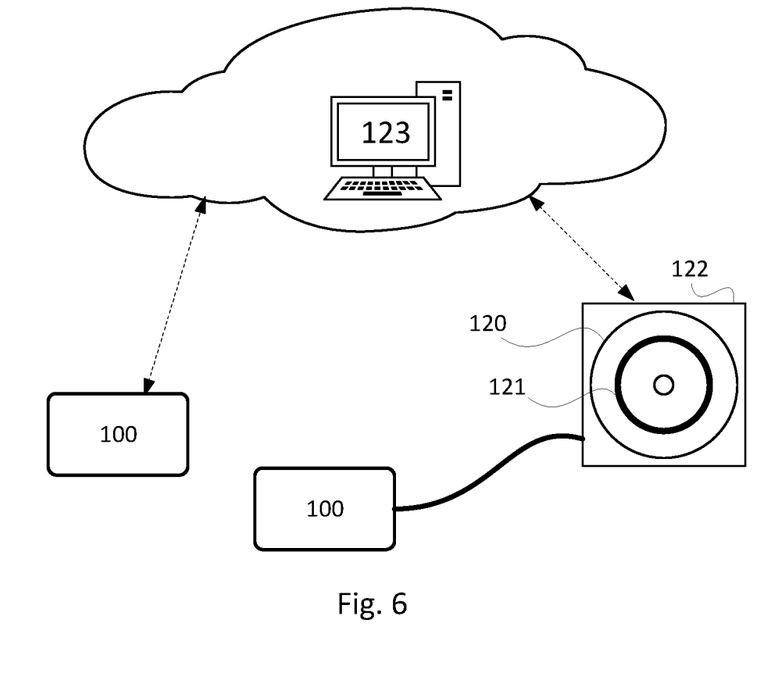
FIG. 6 shows a schematic view of a computer-readable medium carrying computer instructions that when loaded into and executed by a controller of an arrangement enables the arrangement to implement an embodiment of the present invention.

FIG. 6 shows a schematic view of a computer-readable medium 120 carrying computer instructions 121 that when loaded into and executed by a controller of an image filtering arrangement 100 enables the image filtering arrangement 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the image filtering arrangement 100 for being executed by the controller 101.

The computer disc reader 122 may also or alternatively be connected to (or possibly inserted into) an image filtering arrangement 100 for transferring the computer-readable computer instructions 121 to a controller of the image filtering arrangement (presumably via a memory of the image filtering arrangement 100).

FIG. 6 shows both the situation when an image filtering arrangement 100 receives the computer-readable computer instructions 121 via a wireless server connection (non-tangible) and the situation when another image filtering arrangement 100 receives the computer-readable computer instructions 121 through a wired interface (tangible). This enables for computer-readable computer instructions 121 being downloaded into an image filtering arrangement 100 thereby enabling the image filtering arrangement 100 to operate according to and implement the invention as disclosed herein.

The invention claimed is:

1. An image filtering arrangement comprising a controller, wherein the controller is configured to cause the image filtering arrangement to:
   a) receive an image data file;
   b) propose zero or more regions of interest for the image data file; and to
   c) select adaptive filtering for at least one of the proposed zero or more regions of interest and apply the selected adaptive filtering to the at least one of the proposed zero or more regions of interest,
   wherein the controller is further configured to select said adaptive filtering for a region of interest based on a characteristic of the region of interest.

2. The image filtering arrangement according to claim 1, wherein the image data file is in raw format.

3. The image filtering arrangement according to claim 1, wherein the controller is further configured to select said adaptive filtering for a region of interest based on a characteristic of the region of interest exceeding or falling short of a threshold.

4. The image filtering arrangement according to claim 1, wherein the characteristic of the region of interest is a probability that the region contains an object.

5. The image filtering arrangement according to claim 4, wherein the controller is further configured to select a first set of filters for a first region of interest having a first probability and a second set of filters for a second region of interest having a second probability, wherein the first probability is higher than the second probability and wherein the first set of filters represent a more extensive filtering than the second set of filters.

6. The image filtering arrangement according to claim 1, wherein the controller is further configured to select adaptive filtering for each of the proposed zero or more regions of interest and adapt the selected adaptive filtering to each of the proposed zero or more regions of interest.

7. The image filtering arrangement according to claim 1, wherein the controller is further configured to select zero filters as adaptive filtering for regions of the image data file not proposed as being regions of interest.

8. The image filtering arrangement according to claim 1, wherein the controller is further configured to select a first set of filters for a first region of interest and a second set of filters for a second region of interest, wherein the first set of filters include at least one filter of a first type and/or variation and the second set of filters include at least one filter of a second type and/or variation.

9. The image filtering arrangement according to claim 1, wherein the controller is further configured to apply at least one common filter prior to proposing regions.

10. The image filtering arrangement according to claim 9, wherein the at least one common filter is a Bayer format filter.

11. The image filtering arrangement according to claim 1, wherein the controller is further configured to apply further processing to the regions of interest subsequent to applying the selected filters.

12. The image filtering arrangement according to claim 11, wherein the further processing is object detection.

13. The image filtering arrangement according to claim 12, wherein the object detection is based on a Deep Neural Network model.

14. The image filtering arrangement according to claim 1, wherein the image filtering arrangement is a camera device.

15. The image filtering arrangement according to claim 1, wherein the image filtering arrangement is a smartphone or a tablet computer.

16. The image filtering arrangement according to claim 1, wherein the image filtering arrangement is an optical see-through device.

17. The image filtering arrangement according to claim 1, wherein the image filtering arrangement is arranged to be used in image retrieval, industrial use, robotic vision and/or video surveillance.

18. A method for object detection in an image filtering arrangement, wherein the method comprises:
   a) receiving an image data file;
   b) proposing zero or more regions of interest for the image data file;
   c) selecting adaptive filtering for at least one of the proposed zero or more regions of interest and apply the selected adaptive filtering to the at least one of the proposed zero or more regions of interest,
   wherein selecting said adaptive filtering for a region of interest is based on a characteristic of the region of interest.

19. A nontransitory computer-readable medium carrying computer instructions that when loaded into and executed by a controller of an image filtering arrangement causes the image filtering arrangement to perform a method for object detection, wherein the method comprises:
   a) receiving an image data file;
   b) proposing zero or more regions of interest for the image data file; and
   c) selecting adaptive filtering for at least one of the proposed zero or more regions of interest and apply the selected adaptive filtering to the at least one of the proposed zero or more regions of interest,
   wherein selecting said adaptive filtering for a region of interest is based on a characteristic of the region of interest.

20. An image filtering arrangement comprising circuitry for filtering images comprising:
   a) a circuitry for receiving an image data file;
   b) a circuitry for proposing zero or more regions of interest for the image data file; and
   c) a circuitry for selecting adaptive filtering for at least one of the proposed zero or more regions of interest and apply the selected adaptive filtering to the at least one of the proposed zero or more regions of interest,
   wherein the circuitry for selecting adaptive filtering is further configured to select said adaptive filtering for a region of interest based on a characteristic of the region of interest.

* * * * *